United States Patent [19]

Inoue

[11] Patent Number: 4,738,326
[45] Date of Patent: Apr. 19, 1988

[54] OFF THE ROAD VEHICLE

[75] Inventor: Tetsuo Inoue, Iwata, Japan

[73] Assignee: Yamaha Hatsudoki Kabushiki Kaisha, Japan

[21] Appl. No.: 755,699

[22] Filed: Jul. 16, 1985

[30] Foreign Application Priority Data

Jul. 17, 1984 [JP] Japan ................................. 59-146743

[51] Int. Cl.⁴ ............................................. B60K 17/28
[52] U.S. Cl. .................................. 180/53.1; 180/75.1
[58] Field of Search ..................... 180/215, 75.1, 53.1, 180/70.1

[56] References Cited

U.S. PATENT DOCUMENTS

| 874,075 | 12/1907 | Hovey | 180/70.1 |
| 1,596,480 | 8/1926 | Cosgrove et al. | 180/75.1 |
| 1,792,485 | 2/1931 | Fawick | 180/75.1 |
| 3,361,222 | 1/1968 | Lamburn | 180/75.1 |
| 4,373,601 | 2/1983 | Onda et al. | 180/75.1 |
| 4,540,061 | 9/1985 | Watanabe | 180/215 |

FOREIGN PATENT DOCUMENTS

| 600287 | 11/1959 | Italy | 180/215 |
| 377659 | 6/1964 | Switzerland | 180/53.1 |
| 2088974 | 6/1982 | United Kingdom | 180/53.1 |

Primary Examiner—John J. Love
Assistant Examiner—Ross Weaver
Attorney, Agent, or Firm—Ernest A. Beutler

[57] ABSTRACT

Several embodiments of off the road vehicles of the type suspended on balloon tires and embodying a motorcycle-type power unit having an internal combustion engine and a crankcase contained change speed transmission. In each embodiment, an auxiliary transmission is carried by the driven axle remotely from the main change speed transmission so as to provide more weight on the driven axle and so as to reduce the overall width of the vehicle. In some embodiments, a power takeoff shaft is driven by the auxiliary transmission.

7 Claims, 4 Drawing Sheets

OFF THE ROAD VEHICLE

BACKGROUND OF THE INVENTION

This invention relates to an off the road vehicle and more particularly to a transmission, driving and power takeoff arrangement for an off the road vehicle.

Recently, there has been proposed a type of off the road vehicle that employs as its power unit a combined engine, crankcase, transmission assembly of the type normally used in a motorcycle. Such vehicles are designed normally to accommodate a single rider and have three or four wheels equipped with low pressure, balloon tires. Such tires are of the wide profile type and are inflated to relatively low pressures, such as in the range of 0.1 to 0.3 Kg/cm$^2$.

The motorcycle engine power unit, as has been noted, employs a combined crankcase, transmission assembly in which the engine output shaft and a plural speed, change speed transmission is incorporated. Such change speed transmission normally include three, four or five forward speeds as well as the clutch mechanism for coupling the engine output shaft to the transmission input shaft. This type of vehicle was originally proposed primarily for recreational use, but now has been found that the vehicle also lends itself to a number of practical tasks, such as agricultural use or the like.

Because of the off the road use of such vehicles, the motorcycle transmission normally employed does not provide a sufficient number or range of transmission ratios. In addition, it is desirable to provide a reverse gear, which many motorcycle transmissions do not employ. Therefore, it has been proposed to attach an auxiliary transmission to the main transmission of the power unit so as to provide additional ratios and/or a reverse gear. However, since the vehicle is normally designed to handle a single rider, if the auxiliary transmission is attached to a side of the main transmission, this increases the width of the power unit substantially. This can provide an awkward riding position since the transmission of the main power unit is normally disposed between the rider's legs. The additional of the auxiliary transmission can unnecessarily and excessively widen the vehicle and cause the operator to have an unsatisfactory or uncomfortable riding position.

It is, therefore, a principal object of this invention to provide an improved transmission and driving arrangement for an off the road vehicle.

It is a further object of this invention to provide an improved compact and better weight distributed transmission and drive assembly for an off the road vehicle designed for operation by a single rider.

It is a yet further object of this invention to provide an improved transmission unit for an off the road vehicle embodying a main transmission and an auxiliary transmission so located that they do not add to the width of the main power unit.

In order to lend itself for application for practical as well as recreational purposes, it is desirable to incorporate a power takeoff from the engine transmission assembly so as to permit the driving of an accessory, even when the power unit and vehicle are stationary. For this purpose, it has been proposed to incorporate a power takeoff in the auxiliary transmission. However, when the auxiliary transmission is mounted adjacent to or as a part of the main engine transmission unit, the power takeoff shaft may not be disposed in as convenient a location as is required for driving external accessories.

It is, therefore, yet a further object of this invention to provide an improved transmission power takeoff assembly for an off the road vehicle.

SUMMARY OF THE INVENTION

A feature of this invention is adapted to be embodied in a drive arrangement for an off the road vehicle or the like that comprises a pair of transversely spaced apart wheels. An engine, transmission assembly consisting of an internal combustion engine and a main change speed transmission having an input shaft driven by the output shaft of the engine and providing a drive shaft driven at any of a plurality of forward speeds from the input shaft is provided for powering the wheels. In accordance with the invention, an auxiliary change speed transmission is positioned between the pair of wheels and remotely from the engine transmission assembly and drives at least one of the wheels. Means are provided for driving the auxiliary transmission from the main change speed transmission output shaft.

DETAILED DESCRIPTION OF THE PREFERRED EMBODIMENTS

Figure 1:
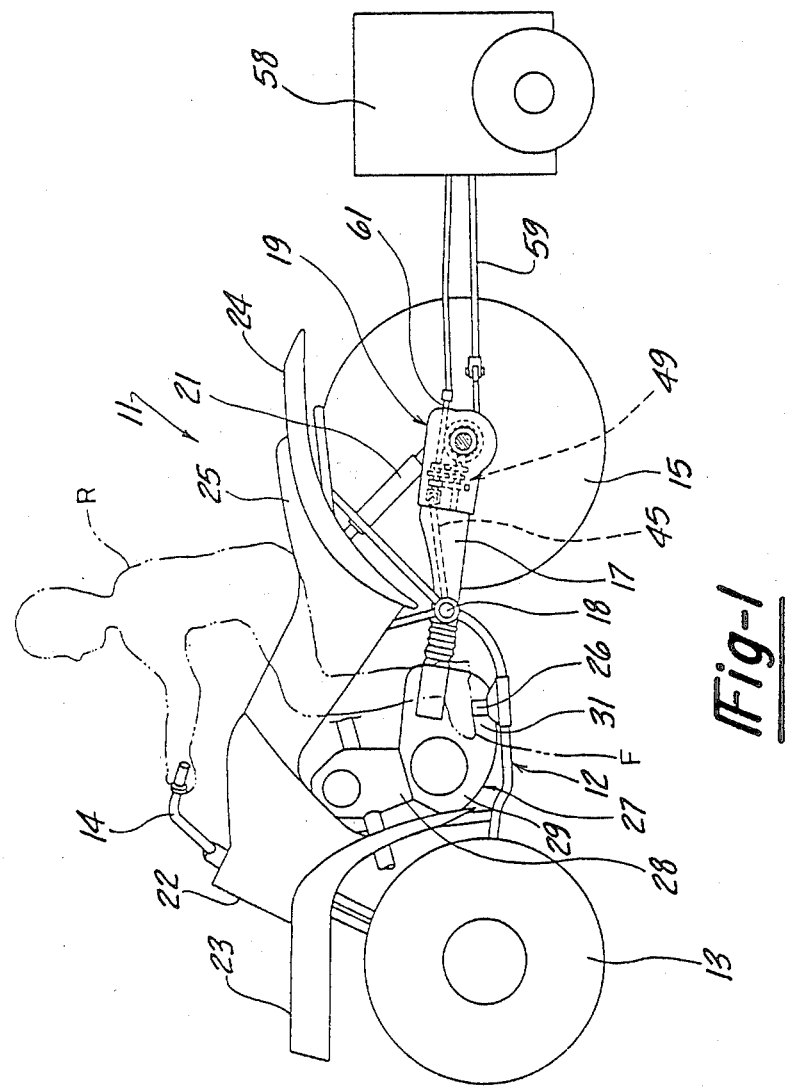
FIG. 1 is a side elevational view of an off the road vehicle embodying a transmission assembly constructed in accordance with an embodiment of the invention and pulling and driving an accessory.
Figure 2:
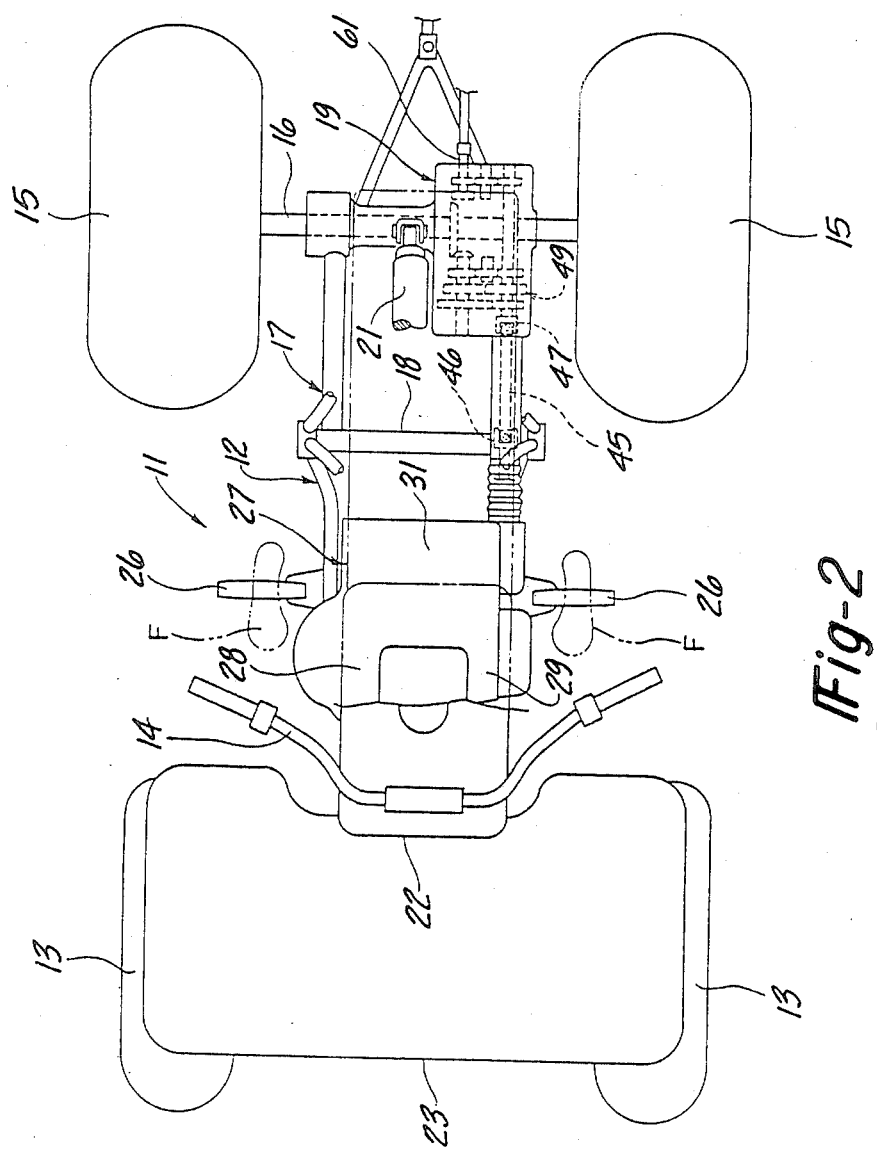
FIG. 2 is an enlarged scale top plan view of the vehicle with portions removed.
Figure 3:
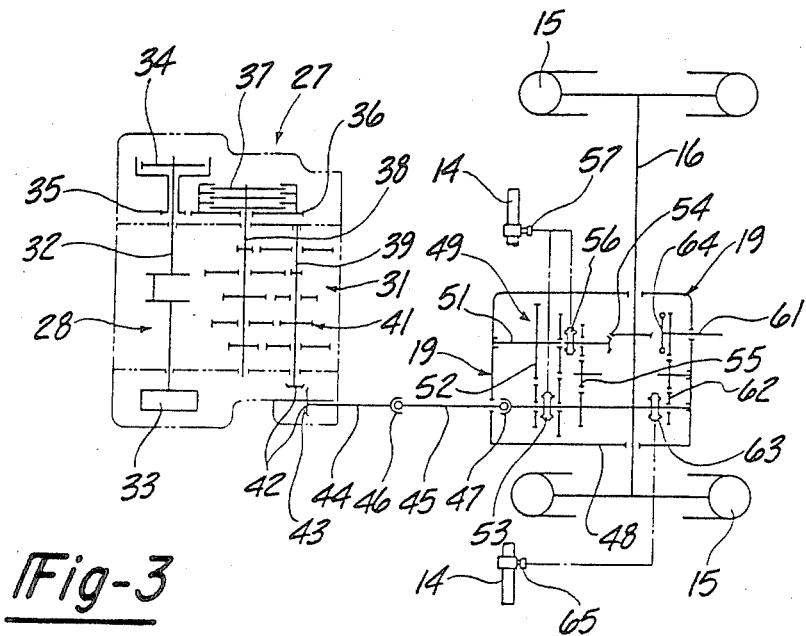
FIG. 3 is a schematic top plan view showing the transmission mechanism of the vehicle.

Referring now first to the embodiment of FIGS. 1 through 3, a vehicle constructed in accordance with this embodiment is identified generally by the reference numeral 11. The vehicle 11 includes a main frame assembly, indicated generally by the reference numeral 12, which may be of the welded up tubular type and which dirigibly supports a pair of front wheels carrying low pressure balloon tires 13 in any suitable manner. The wheels 13 are steered by means of a handlebar assembly 14. In addition, a pair of rear wheels mounting balloon tires 15 are non-rotatably affixed to a rear axle 16 which is, in turn, journaled and supported for suspension movement by means of a trailing arm assembly, indicated generally by the reference numeral 17.

The trailing arm assembly 16 includes a cross tube 18 that is pivotally supported to the rear end of the main frame 12 and which has a pair of trailing arms that support a final drive assembly and axle carrier, indicated generally by the reference numeral 19. The suspension movement of the trailing arm assembly 16 is controlled by means of a suspension element 19 which may consist of a tubular shock absorber and surround coil spring. The suspension element 21 is loaded between the final drive and axle carrier 19 and a suitable component of the main frame assembly 12.

A body consisting of a front cowling 22 and front fender assembly 23 is positioned on the frame 12. The body further includes a rear fender assembly 24 and a seat 25 on which a single operator is accommodated, such an operator being shown in phantom and identified by the character R. The operator R normally is seated so that his feet F are supported on a pair of transversely spaced apart foot pegs 26 that are carried by the frame assembly 12 at opposite sides thereof.

A power unit, indicated generally by the reference numeral 27, is provided for powering the vehicle 11. The power unit 27 is of the type normally employed in a motorcycle and includes an engine 28 of the internal combustion type and which may comprise a single reciprocating piston and combined crankcase, transmission assembly 29 incorporating an integral change speed transmission 31.

The construction and layout of the main power unit 27 may be best understood by reference to FIG. 3 wherein the layout of the main transmission 31 and its driving relation to the engine 28 is shown schematically.

The engine 28 includes a driven output shaft 32 which, in this case, is a crankshaft. The crankshaft 32, in turn, drives an alternator 33 and a centrifugal clutch 34 at its opposite ends. The centrifugal clutch 34, in turn, drives a gear 35 when the speed of the crankshaft 32 exceeds that at which the centrifugal clutch 34 engages. The gear 35, in turn, drives a gear 36 which comprises the input of a multiple disk clutch assembly 37. The multiple disk clutch assembly 37, in turn, selectively drives a primary or input shaft 38 of the main change speed assembly 31. A secondary shaft 39 is disposed parallel to the primary shaft 38 and a plurality of gear sets 41 interconnect the two shafts for rotation. A plurality of dog clutches (not shown) are provided for selectively coupling the gear pairs 41 to their respective shafts so as to drive a pinion or bevel gear 42 that is affixed to the transmission secondary shaft 39 at any of a plurality of selected forward speed ratios. It should be noted that the shafts 32, 38 and 39 all rotate about axes that are disposed transversely to the longitudinal axis of the vehicle 11.

The bevel gear 42, in turn, drives a bevel gear 43 that is affixed to an output shaft 44. The output shaft 44 drives a drive shaft 45 by means of a universal joint 46. In this embodiment, the drive shaft 45 is rotatably journaled in one of the trailing arms of the trailing arm assembly 17.

The drive shaft 45, in turn, is connected by means of a universal joint 47 to an input shaft 48 of an auxiliary transmission assembly, indicated generally by the reference numeral 49, which forms a portion of the final drive assembly 19. The auxiliary transmission 49 also includes a secondary or output shaft 51 and a pair of gear sets 52 are carried by the shafts 48 and 49 and are enmeshed with each other continuously. A dog clutch assembly 53 is provided for selectively coupling a respective one of the gear sets 52 for coupling this gear to the input shaft 48 so as to drive the output shaft 51 to which the corresponding gear of the other gear set is non-rotatably affixed. The secondary shaft 51 drives the rear axle assembly 16 by means of a ring and pinion set 54.

A reversing gear assembly 55 is also provided between the shafts 48 and 51 and is suitably coupled to the shaft 51 by means of a dog clutch assembly 56 when the dog clutch assembly 53 is in a neutral position for driving the axle 16 in reverse. A cable assembly 57 carried by the handlebar 14 is provided for actuating the dog clutches 53 and 56 so as to drive the rear axle 16 either at a low speed, a high speed or in reverse. It should be understood that this transmission ratio may also be coupled with the various ratios of the main change speed transmission 31 so as to provide a wide variety of speed ratios.

As has been noted, the vehicle 11 may be utilized either for recreational or for work usages. For this latter usage, the vehicle 11 may pull any of a variety of agricultural implements or other type of implements such as a broadcast spreader 58 by means of a hitch assembly 59. A power takeoff shaft 61 is provided for driving the implement. The power takeoff shaft 61 is contained within the final drive assembly 19 and includes a gear set 62 that may be selectively coupled to the primary shaft 48 of the auxiliary transmission 49 by means of a dog clutch 63. The desired speed ratio may be employed in the gear set 62 and, of course, the ratios of the main transmission 31 also may be provided for selectively choosing the output speed of the power takeoff shaft 61. When operating in the power takeoff mode and stationary, a governor assembly 64 driven by the power takeoff shaft 61 may control the speed of the engine 28 in a known manner. The dog clutch 63 is controlled by means of a cable assembly 65 mounted to the other of the handlebars.

Figure 4:
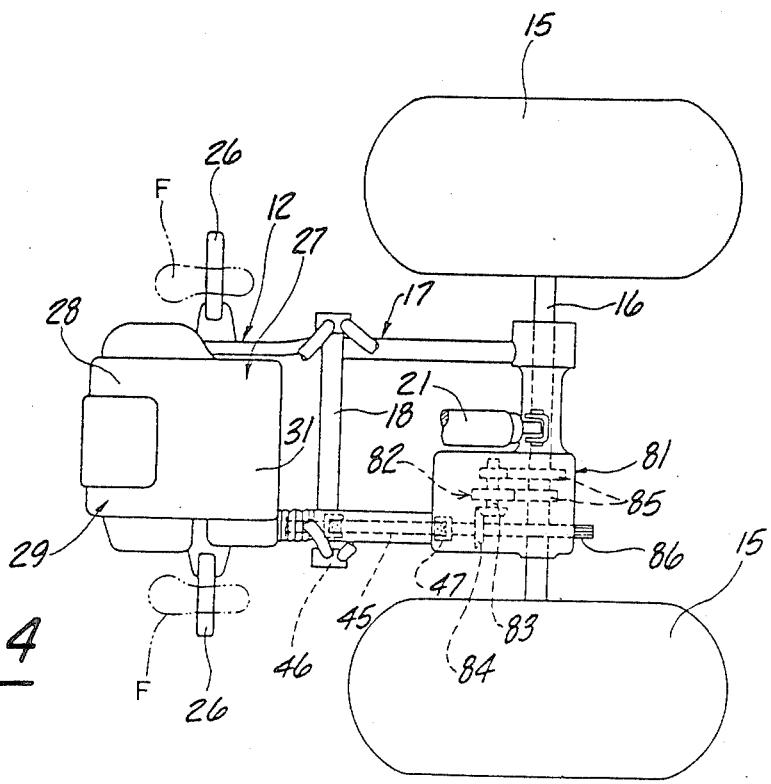
FIG. 4 is a top plan view, in part similar to FIG. 2, showing only a portion of the vehicle constructed in accordance with another embodiment of the invention.

FIG. 4 shows another embodiment of the invention which is generally similar to the embodiment of FIGS. 1 through 3. For that reason, all identical components have been identified by the same reference numerals and will not be described again in detail. This embodiment differs from the embodiment of FIGS. 1 through 3 only in the construction of the final drive and auxiliary transmission and the final drive assembly which has been indicated generally by the reference numeral 81. In this embodiment, an auxiliary transmission 82 consists of a primary or input shaft 83 that is driven from the drive shaft 45 by means of a bevel gear set 84. The primary shaft 83 has journaled upon it a pair of gears which are enmeshed with a pair of gears 85 that are affixed to the rear axle 16 so that the rar axle 16 forms the secondary or output shaft of the auxiliary transmission 82. A dog clutch assembly (not shown) is provided for selectively coupling either of the gears of the primary shaft 83 to this shaft for driving the rear axle 16 at the desired speed ratio. If desired, a reverse gear set also may be employed which drives the rear axle 16 directly.

In this embodiment, a shaft 86 to which the input bevel gear 84 is affixed extends through the casing and provides the power takeoff.

Figure 5:
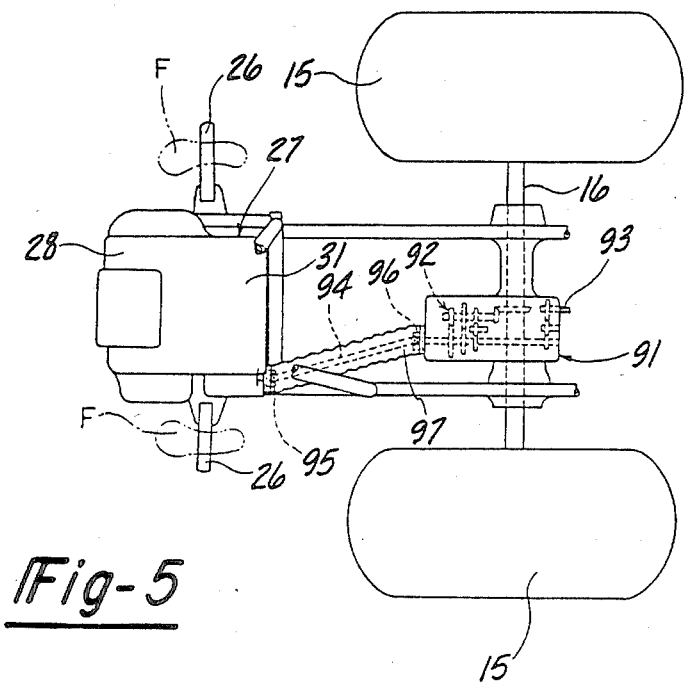
FIG. 5 is a partial top plan view, in part similar to FIGS. 2 and 4, showing another embodiment of the invention.

FIG. 5 shows yet another embodiment of the invention. The embodiment of FIG. 5 differs from the previous embodiments only in the location of the auxiliary transmission and for this reason components which are the same as the components of the previously described embodiments will be identified by the same reference numerals and will not be described again in detail.

In the two previously described embodiments, the final drive and auxiliary transmission assembly were offset to one side of the rear axle 16. In the embodiment of FIG. 5, a final drive assembly, indicated generally by the reference numeral 91 and incorporating an auxiliary transmission 92 and a power takeoff shaft 93 are positioned centrally of the axle shaft 16. The final drive 91 may be of either the form shown in FIGS. 1 through 3 or of the form shown in FIG. 4 as may be the power takeoff shaft. In this embodiment, to accommodate the central position of the final drive 91, a drive shaft 94 is disposed at an angle as shown in FIG. 5 and is coupled to the output shaft of the primary transmission 31 by means of a univeral joint 95 and to the input shaft of the auxiliary transmission 92 by means of a universal joint 96. A flexible boot 97 encircles the drive shaft 94 and the universal joints 95 and 96. In this embodiment, the rear axle 16 may be either suspended by means of a trailing arm assembly as previously described or may be rigidly connected to the main frame assembly 12.

Figure 6:
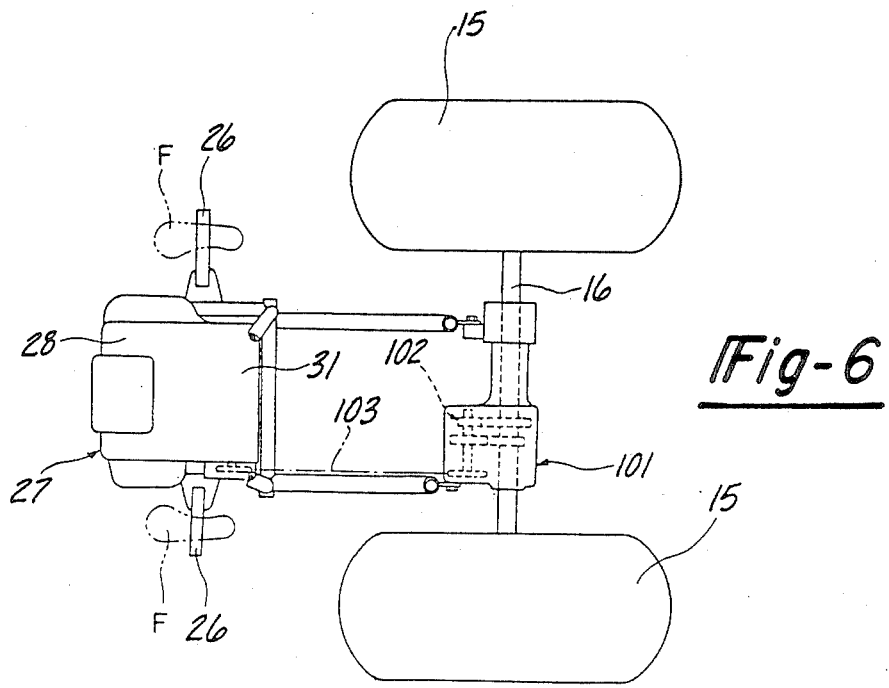
FIG. 6 is a top plan view, in part similar to FIGS. 2, 4 and 5, showing a yet further embodiment of the invention.

FIG. 6 shows yet a further embodiment of this invention. Since the construction of this embodiment is generally similar to the preceding embodiments, those components which are the same have been identified by the same reference numerals and will not be described again in detail. In this embodiment, a final drive assembly 101 incorporates an auxiliary transmission 102. A chain drive 103 transmits power from a sprocket driven by the output shaft of the main transmission assembly 31 to a sprocket on the input shaft of the auxiliary transmission 102 rather than a drive shaft as in the previously described embodiments. For this reason, the auxiliary transmission may be of the type as shown in FIG. 4 wherein its primary shaft extends transversely relative to the vehicle and parallel to the main transmission secondary shaft 39 so as to facilitate the use of the chain drive. The same type of ratios may be employed, however, in this embodiment, a power takeoff shaft is not illustrated and may not be employed.

It should be readily apparent that each of the embodiments illustrated and described provides a highly effective driving arrangement for an off the road vehicle wherein the auxiliary transmission is lcoated in such a way as to not increase the width of the vehicle so as to facilitate its use by a single rider. In addition, the location of the auxiliary transmission at the rear axle 16 places more weight over the rear axle which lends itself to better power transfer for off the road use particularly when providing various work functions. Although a number of embodiments of the invention have been illustrated and described, various changes and modifications may be made, without departing from the spirit and scope of the invention, as defined by the appended claims.

I claim:

1. A drive arrangement for an off the road vehicle or the like comprising frame means, a pair of transversely spaced apart rear wheels mounting low pressure tires, an engine, transmission assembly supported by said frame means and comprised of an internal combustion engine and a main change speed transmission having an input shaft driven by the output shaft of the engine and providing a driven shaft driven at any of a plurality of forward speeds from said input shaft, the improvement comprising an auxiliary change speed transmission positioned between said pair of rear wheels and remotely from said engine transmission assembly and driving a common axle for driving said rear wheels, said auxiliary transmission including at least a reverse gear, and means for driving said auxiliary transmission from said main change speed transmission output shaft said auxiliary transmission including a power takeoff shaft adapted to be selectively driven for driving an accessory, and a seat designed primarily to accommodate a single rider in straddle fashion carried by said frame means.

2. A drive arrangement as set forth in claim 1 further including a governor driven by the power takeoff shaft for controlling the speed of the engine.

3. A drive arrangement as set forth in claim 1 wherein the engine output shaft, main change speed transmission shafts and auxiliary transmissions shafts all extend parallel to each other and transversely to the longitudinal axis of the vehicle.

4. A drive arrangement as set forth in claim 1 wherein the auxiliary transmission is driven from the main change speed transmission output shaft by a drive shaft.

5. A drive arrangement for an off the road vehicle or the like comprising a pair of transversely spaced apart wheels, an engine, transmission assembly comprised of an internal combustion engine and a main change speed transmission having an input shaft driven by the output shaft of the engine and providing a driven shaft driven at any of a plurality of forward speeds from said input shaft, the improvement comprising an auxiliary change speed transmission positioned between said pair of wheels and remotely from said engine transmission assembly and driving at least one of said wheels, and means for driving said auxiliary transmission from said main change speed transmission output shaft comprising a chain.

6. A drive arrangement as set forth in claim 1 wherein the auxiliary transmission is offset to one side of the axle.

7. A drive arrangement as set forth in claim 1 wherein the auxiliary transmission is positioned centrally of the axle.

* * * * *